No. 607,836.　　　　　　　　　　　　　　　　Patented July 26, 1898.
J. P. DORAU.
ENGINE.
(Application filed May 17, 1897.)

(No Model.)　　　　　　　　　　　　　　　　6 Sheets—Sheet 1.

Witnesses.
O. N. Keeney,
Josephine Faust.

Inventor.
John P. Dorau.
By Benedict and Morsell
Attorneys.

THE NORRIS PETERS CO., PHOTO-LITHO., WASHINGTON, D. C.

No. 607,836. Patented July 26, 1898.
J. P. DORAU.
ENGINE.
(Application filed May 17, 1897.)
(No Model.) 6 Sheets—Sheet 2.

Witnesses.
C. H. Keeney
Josephine Faust

Inventor.
John P. Dorau
By Benedict & Morsell
Attorneys.

THE NORRIS PETERS CO., PHOTO-LITHO., WASHINGTON, D. C.

No. 607,836. Patented July 26, 1898.
J. P. DORAU.
ENGINE.
(Application filed May 17, 1897.)
(No Model.) 6 Sheets—Sheet 3.

Witnesses.
C. N. Keeney
Josephine Faust

Inventor.
John P. Dorau
By Benedict and Morsell
Attorneys.

THE NORRIS PETERS CO., PHOTO-LITHO., WASHINGTON, D. C.

No. 607,836. Patented July 26, 1898.
J. P. DORAU.
ENGINE.
(Application filed May 17, 1897.)
(No Model.) 6 Sheets—Sheet 4.

Witnesses.
O. H. Keeney
Josephine Faust

Inventor.
John P. Dorau.
By Benedict and Morsell.
Attorneys.

No. 607,836. Patented July 26, 1898.
J. P. DORAU.
ENGINE.
(Application filed May 17, 1897.)
(No Model.) 6 Sheets—Sheet 5.

Witnesses. Inventor.
John P. Dorau.
Attorneys.

No. 607,836. Patented July 26, 1898.
J. P. DORAU.
ENGINE.
(Application filed May 17, 1897.)
(No Model.) 6 Sheets—Sheet 6.

Witnesses.
Inventor.
John P. Dorau
By Benedict and Morsell.
Attorneys.

UNITED STATES PATENT OFFICE.

JOHN P. DORAU, OF LARK, WISCONSIN.

ENGINE.

SPECIFICATION forming part of Letters Patent No. 607,836, dated July 26, 1898.

Application filed May 17, 1897. Serial No. 636,887. (No model.)

*To all whom it may concern:*

Be it known that I, JOHN P. DORAU, of Lark, in the county of Brown and State of Wisconsin, have invented a new and useful Improvement in Engines, of which the following is a description, reference being had to the accompanying drawings, which are a part of this specification.

My invention has relation to improvements in engines.

It relates more particularly to that form of engine in which the ordinary longitudinally-reciprocating piston is replaced by a rotary piston.

Among the objects contemplated are simplicity and cheapness in construction; maximum power, the engine being always at the full-power point, without any dead-centers; reduction of friction and cross-strain; provision for balancing the movable steam-gates at all times, obviating the necessity of lubricating, the parts being always encircled by steam, which acts as a constant lubricator, and an improved form of rotary piston.

With the above primary and other objects in view the invention consists of the devices and parts or their equivalents, as hereinafter more fully set forth.

Figure 1:
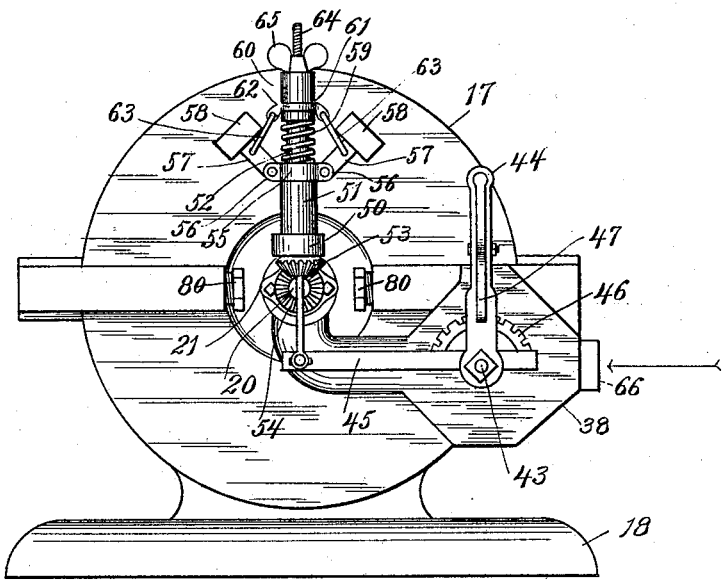
Figure 2:
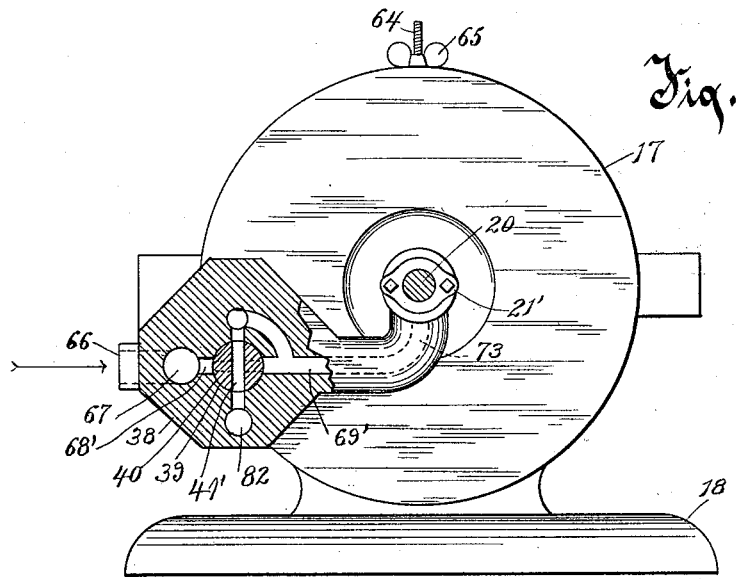
Figure 3:
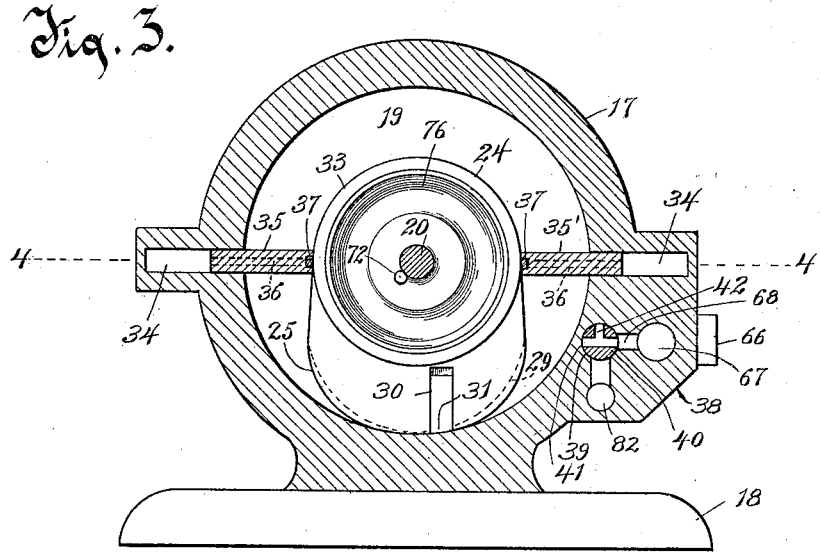
Figure 4:
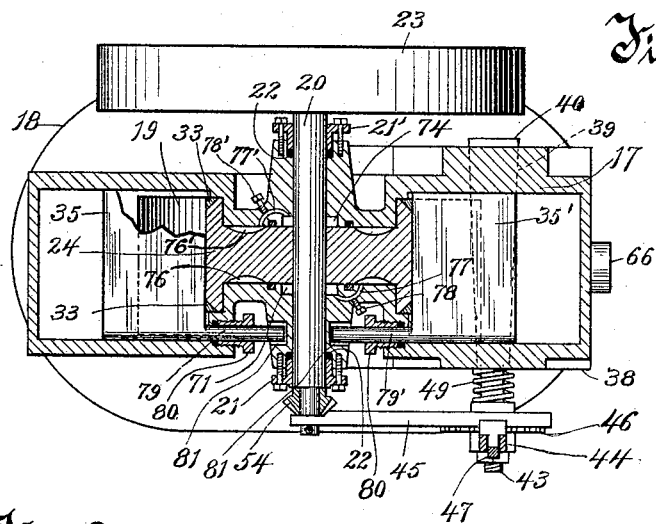
Figure 8:
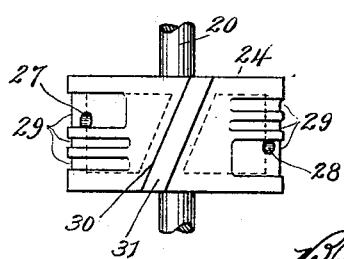
Figure 5:
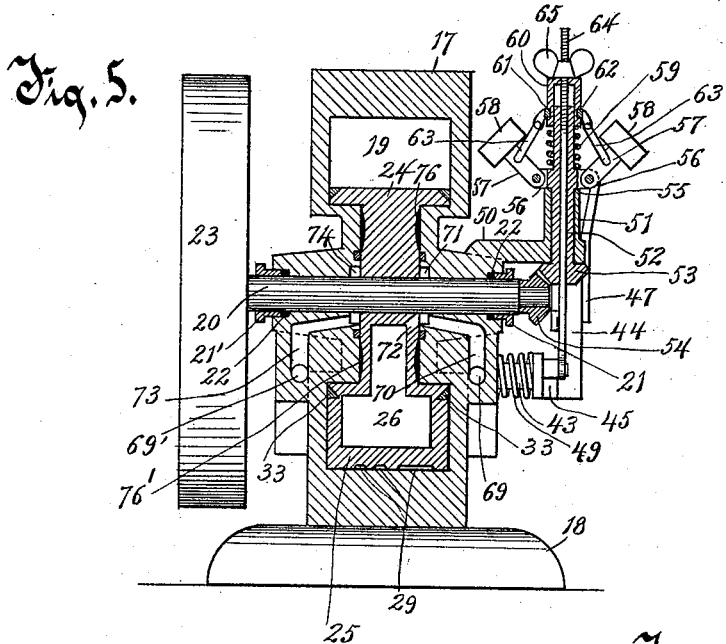
Figure 7:
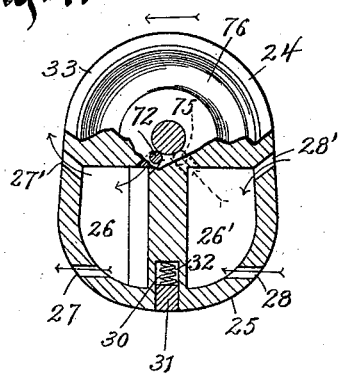
Figure 6:
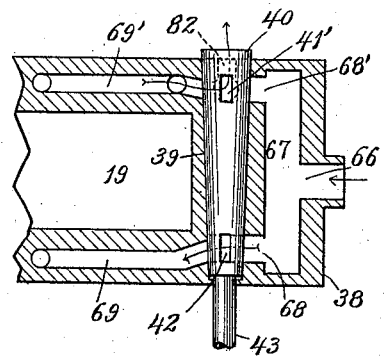
Figure 9:
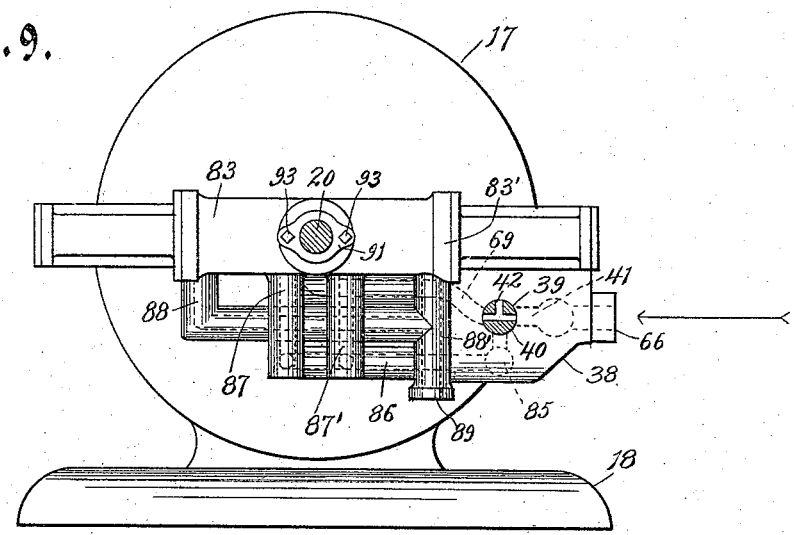
Figure 10:
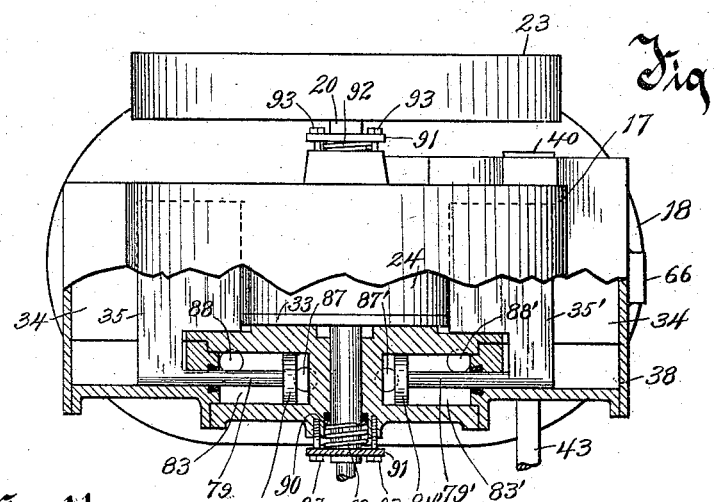
Figure 11:
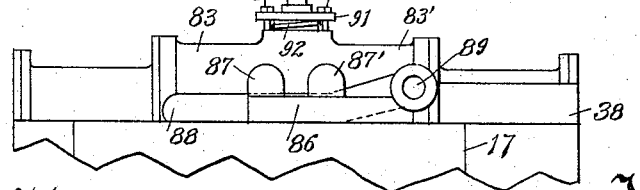
Figure 12:
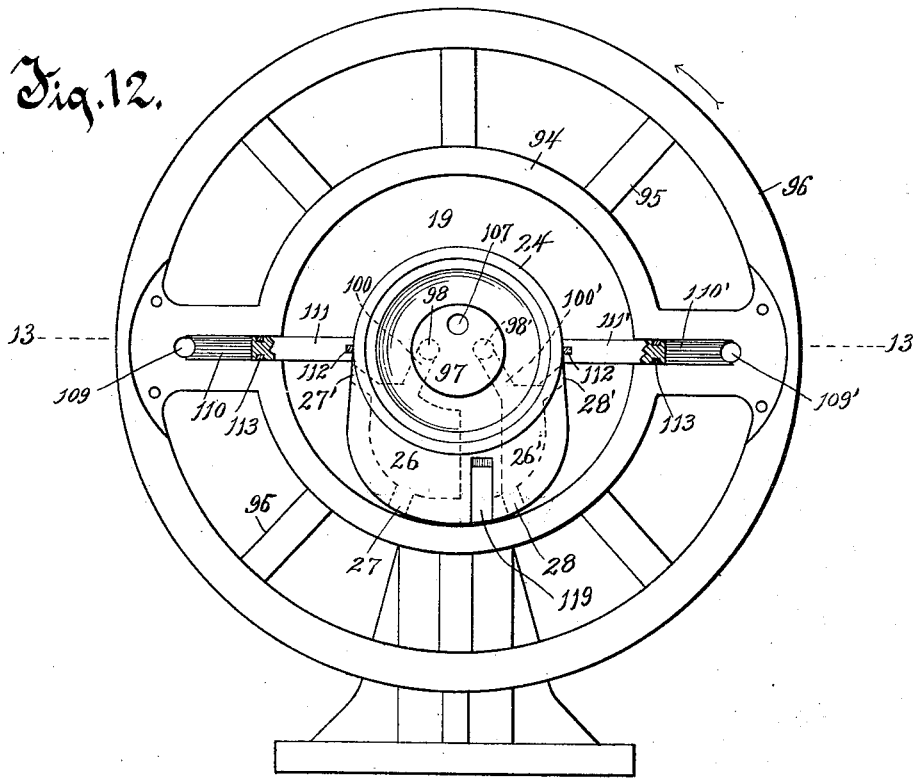
Figure 13:
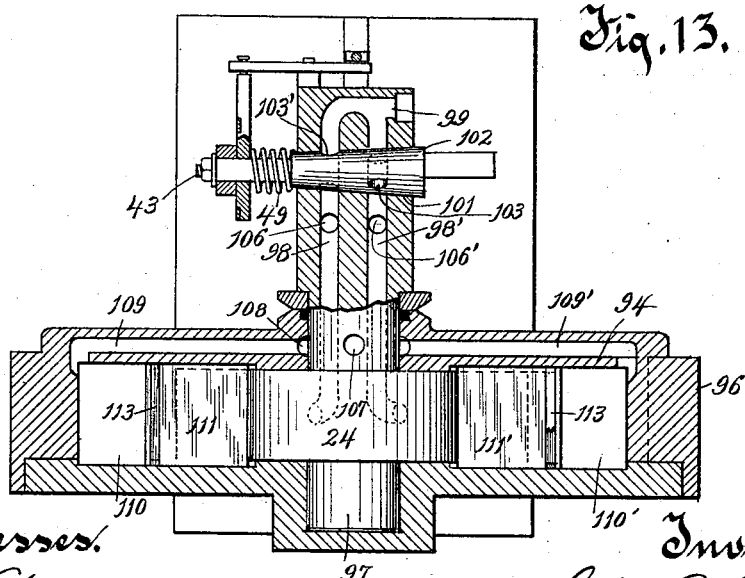
Figure 14:
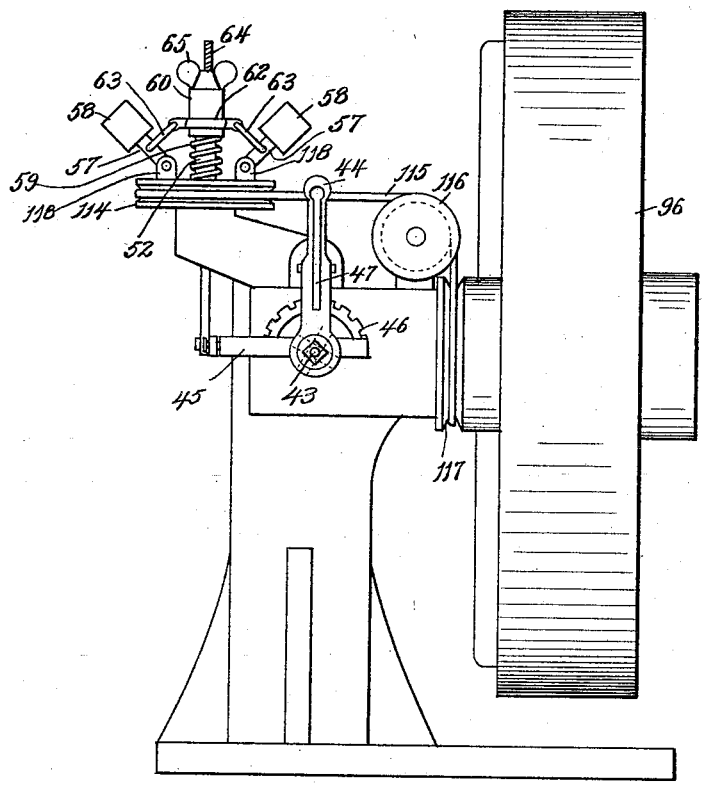
Figure 16:
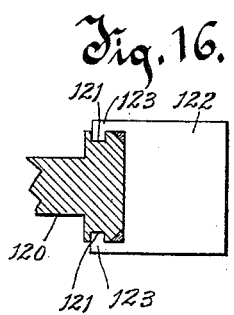
Figure 15:
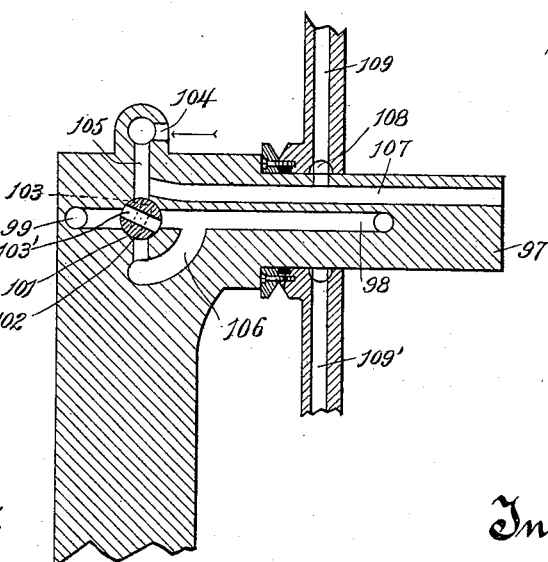

In the accompanying drawings, Figure 1 is a front view of the engine. Fig. 2 is a rear view with parts broken away to show the valve and certain steam-ports. Fig. 3 is a front view with the side piece removed and parts in section. Fig. 4 is a horizontal section on the line 4 4 of Fig. 3 with a part broken away. Fig. 5 is a transverse vertical sectional view with parts broken away. Fig. 6 is a detail sectional view showing the conical valve. Fig. 7 is a detail view of the piston, the lower portion thereof being broken away. Fig. 8 is a detail view of the piston, looking at the portion thereof where the packing is arranged. Fig. 9 is a side elevation of a modified form. Fig. 10 is a plan view of Fig. 9 with parts broken away. Fig. 11 is a detail view looking up at the steam inlet and exhaust ducts of the Fig. 9 form of construction. Fig. 12 is an elevation of another modified form of construction with the side removed and parts in section. Fig. 13 is a horizontal section on the line 13 13 of Fig. 12. Fig. 14 is an end view of Fig. 12. Fig. 15 is a detail sectional view showing the valve of the Fig. 12 form of construction and certain of the steam-ducts; and Fig. 16 is a sectional view of a fragment of a modified form of the piston, showing a modified form of steam-gate in connection therewith.

Referring to the drawings, the numeral 17 in the forms of construction of Figs. 1 to 11, inclusive, indicates a circular casing, which is supported on a suitable base 18. This casing forms an interior circular chamber 19, which is intersected centrally by a transverse shaft 20. The opposite ends of this shaft are journaled in projections from the opposite side pieces of the casing, which projections form journal-boxes and are rendered steam-tight by means of glands 21 21'. These glands serve to compress packings 22 22 into recesses in the journal-boxes. One of the outer ends of the shaft 20 carries a fly-wheel 23. Mounted upon the shaft within the circular chamber 19 of the casing is a rotary piston 24. This piston is formed with an eccentric projection 25, and said eccentric portion is provided with interior chambers 26 26'. The chamber 26 has extending therefrom outwardly to the periphery of the piston steam ducts or passages 27 27', and chamber 26' has extending outwardly therefrom to the periphery of the piston similar steam ducts or passages 28 28'. The periphery of the eccentric portion of the piston is formed with a series of steam leads or recesses 29, as shown more clearly in Fig. 8, the function of which will hereinafter more fully appear.

A medial point of the edge or periphery of the eccentric is intersected by a diagonal recess 30, in which is fitted a packing-strip 31, said strip being pressed outwardly by means of a coiled spring 32, interposed between the inner sides of the strip and the bottom of the recess. The opposite sides of the piston are also provided therearound, near their outer edges, with annular packing-strips 33 33.

Diametrically opposite points of the casing 17 are provided with horizontal recesses 34 34, in which are fitted, so as to reciprocate therein, sliding steam-gates 35 35'. These gates have each along one of their side edges a recess 36, forming a steam-passage to admit steam into the space of the recess 34 back of said steam-gate. The steam passes into one of these recesses after the piston begins to move the sliding gate outwardly. At this time the inner end of the guideway-groove for the gate is opened, so that the steam is free to enter the recess 36. The inner edges of the gates, which are adapted to bear against the piston, are provided with suitable packing-strips 37 37. One side of the circular casing 17 has a projecting portion 38, which is formed with a transverse tapering opening 39. In this tapering opening is fitted a conical valve 40, said valve being intersected near opposite ends by openings 41 41', said openings being arranged at right angles to each other. The opening 41 has leading thereto at right angles a passage 42. This valve has projecting therefrom to the exterior a valve-stem 43, and to the extremity of the stem is rigidly connected an upwardly-extending operating-handle 44. An arm 45 is mounted loosely on the valve-stem, and this arm has formed rigid therewith a segmental rack 46, with which rack a dog 47, carried by the operating-handle, is adapted to engage. A coiled spring 49 encircles the valve-stem between the arm 45 and the side of the casing. Projecting out from the front side of the casing is a bracket 50, having extending upwardly therefrom a tubular post 51. Extending through this tubular post is a tubular shaft 52. The lower end of this shaft is formed or provided with a beveled gear 53, which beveled gear meshes with the beveled gear 54 on the main shaft 20. Surrounding the tubular shaft 52, just above the tubular post 51, is a collar 55, said collar having projecting out therefrom the lugs 56 56, between which are pivoted the stems 57 57 of the governor-balls 58 58. Surrounding the tubular shaft 52, above the collar 55, is a coiled spring 59. This spring is confined between the collar 55 and a cap 60, arranged on the upper end of the tubular shaft 52. This cap is provided at its lower end with an annular groove 61, in which fits a collar 62. Connected to opposite points of this collar are the upper ends of links 63 63. The lower ends of these links are pivotally connected to the governor-ball stems. Passing through the cap-piece 60 and through the tubular shaft 52 and the beveled gear 53 at the lower end of said shaft is a rod 64. Turning on the upper end of this rod is an adjusting-nut 65. The lower end of the rod is pivotally connected to the arm 45. It will be understood, of course, that the conical valve in the first instance is properly set by means of its operating-handle 44, so that its steam ports or ducts will be so positioned as to make the proper registration with other ducts hereinafter described. The piston in its rotation of course rotates the main shaft 20, and this shaft, through the intermeshing of its beveled gear 54 with the beveled gear 53 of shaft 52, causes said shaft 52 to rotate and the governor-balls to be rotated therewith. If the speed of the machine becomes too great, the governor-balls will by centrifugal force fly outwardly and cause the descent of the cap 60 against the pressure of the coiled spring 59. The downward movement of the cap will also cause a corresponding movement of the rod 64, and said rod 64 will act on the arm 45 and will cause the conical valve to be turned by reason of the engagement of the dog 47 of the operating-handle 44 with the segmental rack 46, which rack, as before described, is fast to the arm 45. This will cause a turning of the conical valve in the proper direction to limit or shut off the live steam. When the speed of the engine has become sufficiently slow, the upward pressure of the spring 59, exerted against the cap 60, will be sufficient to overcome the centrifugal force and will cause the cap 60, and with it the rod 64, to be forced to their normal positions.

The numeral 66 indicates the inlet-opening, which leads to a chamber 67, said chamber being in communication with the tapering opening 39 for the conical valve by means of the two ports 68 68'. Now the openings 41 41' of the conical valve are so positioned that when the opening 41 is in register with the port 68 the opening 41' is out of register with port 68'. Two steam-passages 69 69' extend from opposite ends of the tapering opening 39 along, respectively, the front and rear sides of the circular casing 17, and when the opening 41 of the valve is in register at one end with the port 68 it will be in register at its opposite end with the passage 69. The steam, therefore, is free to flow from the chamber 67 through the port 68, through the opening 41 of the valve, and into the passage 69. This passage 69 leads to the projecting bearing of the front side piece of the circular casing, as indicated at 70, (see Fig. 5,) the passage 70 leading to an annular recess 71, formed in the inner side of the front side piece of the casing. This annular recess 71 registers with a port 72, said port being formed in the piston and leading to the chamber 26 of said piston. The passage 69' also leads to another passage 73, which forms a continuation thereof and extends into the bearing of the rear side of the circular casing. This passage 73 also communicates with an annular recess 74, formed in the rear side piece of the circular casing, and recess 74 is in communication with the chamber 26' of the eccentric by means of a duct 75, formed in the piston. The opposite sides of the piston are provided with annular steam-spaces 76 76'. Leading from the annular recesses 71 and 74 to these respective steam-spaces are passages 77 77'. Adjusting-screws 78 78' are adapted to be screwed across either of these passages, so as to cut off communication between the recesses 71 and 74 and the annular steam-spaces 76 76'. The function of these annular steam-chambers 76 76' and passages 77 77' is as follows: If, for instance, the inlet-steam passes into the annular recess 71 and feeds into the chamber 26, the other chamber 26' of the piston is the exhaust-chamber, and the exhaust-steam passes therefrom into the recess 74. Now this live steam which enters the recess 71 has a tendency to act expansively in the said recess, so as to force the opposite side of the piston against the inner side of the rear side piece of the circular casing, and thereby increase friction. To guard against this, the adjusting-screw 78' is turned out, so as to leave the passage 77' open, while the screw 78 is screwed in, so as to close the passage 77. The live inlet-steam, therefore, cannot pass from the recess 71 into the annular steam-space 76. A portion of the exhaust-steam, however, is free to pass into the annular steam-space 76', and the exhaust-steam which so passes into the annular space 76' acts to counteract the pressure of the steam in the recess against the front side of the piston, and consequently balances said piston. If, on the other hand, the steam-space 76' is receiving inlet-steam and the space 76 is receiving exhaust-steam, then the screw 78' is turned in, so as to close the passage 77', while the screw 78 is turned out, so as to open passage 77, thereby allowing the exhaust-steam to pass into the steam-space 76 and counteract the pressure of the live steam against the opposite side of the piston. The steam-spaces 76 76' also serve as constant steam-lubricators.

It will be noticed that the sliding gates 35 35' are provided at their inner edges, at the forward ends of said edges, with inwardly-extending arms 79 79'. These arms pass through suitable stuffing-boxes 80 80 and enter recesses 81 81 in opposite sides of the projecting bearing of the front side piece of the circular casing.

In the operation of the form of device shown on the first three sheets of the drawings, if the conical valve is in the position shown in Figs. 3 and 6 the steam or other actuating agent passes through the inlet 66 into the chamber 67, thence through the port 68, through the opening 41 of the valve into the passage 69, thence into the passage 70 to the recess 71, and thence through the port 72 into the chamber 26. At the beginning of the operation the piston is in the position shown in Fig. 3—that is to say, with the eccentric portion 25 thereof in the lowermost position, the lower edge of said eccentric touching the circular bordering rim of the chamber 19. The steam which thus passes into the chamber 26 finds its exit through the ports 27 and 27' and fills up the space from the point where the packing 31 bears against the rim of the chamber 19 to the under side of the sliding gate 35. The expansive power of the steam in this space acts against the eccentric and causes the piston, together with the shaft 20, to rotate in the direction of the arrow shown in Fig. 7. Now by the time the piston has been rotated sufficiently far in the direction indicated to bring the port 27 above the sliding gate 35' the steam issuing out of said port 27 will begin to fill up the slight space between the upper side of the sliding gate 35' and the point where the packing 31 touches the bordering rim of the chamber 19, said space constantly enlarging with the continued rotation of the piston. The space between the under sides of the sliding gates 35' and 35 is also still being filled from the port 27' until said port 27' likewise gets above the sliding gate 35'. With the continued rotation of the piston the port 28' soon passes below the gate 35, and the moment it gets below said gate the steam confined in the space between the under sides of the two gates begins to exhaust through the port 28' into the chamber 26', thence through the port 75 into the recess 74, and thence into the passages 73 and 69' and along the latter to the exhaust-opening 82 of the rear side of the circular casing. As soon as the port 28 passes below the gate 35 this port also serves to assist port 28' to exhaust into the chamber 26'. Now after the two exhaust-ports 28 and 28' have passed above the sliding gate 35' the two ports 27 27' are again in position to fill the space below the under side of the two gates, while the exhaust-ports 28 28' are above the gate 35' in position to exhaust the steam left in the space above the upper sides of the two gates. It will be seen from this that a continuous rotary motion is imparted to the piston.

The inner edges of the sliding gates 35 35' are intended to touch the periphery of the piston during the entire time said piston is rotating; but owing to the irregular shape of the periphery of the piston, caused by the eccentric formation, said gates are required to move in and out when the eccentric portion of the piston is touching the same in order to accommodate themselves to such irregular shape of the eccentric. The outward movement of the gates is accomplished by the projecting portion of the eccentric bearing against the inner edges of the gates. In order to facilitate the outward movement, however, I have provided the periphery of the eccentric with the steam-leads 29, which permit the steam to get in between the inner edges of the gates and the periphery of the piston, and thereby act expansively against said edges in order to move said gates outwardly in their guideways or passages. The steam which passes into the guideways 34 acts against the outer edges of the sliding gates and causes said gates to move inwardly when the contour of the piston requires it. These outer edges are longer than the inner edges of the gates, as will be clearly seen from Fig. 4, inasmuch as said inner edges are provided with the projecting arms 79, which pass outwardly into the recesses 81 and are exposed to the external atmosphere. This slight excess in length of the outer edges will cause the steam acting thereagainst to force the gates inwardly against the expansive force of the steam acting against the short inner edges of the gates. In order to facilitate the passage of the steam into the guideways 34, I prefer to provide the edges of the gates with the steam-passages 36, hereinbefore referred to. The steam-leads 29 also serve to allow steam to pass to the upper side of the gates to balance the steam-pressure below.

If it is desired to reverse the engine, all that is required to be done is to release the dog 47 of the operating-handle 44 from engagement with the segmental rack and move said handle in a direction to turn the conical valve one-quarter of a turn to the left with respect to Fig. 3 of the drawings. This will cause the passage 42 to be brought into register with the passage 69 and the opening 41 into register with the exhaust 82 at the same time the opening 41' at the opposite end of the valve is brought into register with the port 68' and the passage 69'. The exhaust-steam, therefore, in the chamber 19 will enter through the ports 27 27' into the chamber 26 of the piston, thence by the passages and ducts hereinbefore described to the passage 42 of the conical valve, and thence downwardly through the opening 40 into the discharge, it being obvious that the inlet-steam from the chamber 67 cannot pass directly to the passage 69 in view of the fact that the opening 41 is out of register with the duct 68 and said passage 69. The steam, therefore, will be exhausted from the chamber 26 of the piston, while the inlet-steam from the chamber 67 will pass through the duct 68', through the opening 41' of the valve into the passage 69', thence into the passage 73 to the recess 74, thence through the port 75 into the chamber 26' of the piston, and thence out through the ports 28 28' into the chamber 19. When it is desired to stop the engine entirely, of course all that is necessary to be done is to turn the handle 44 so that the conical valve will be turned to such a position that none of its ports are in register with the ducts leading from the chamber 67.

In the form of device illustrated on Sheet 4 of the drawings I show a construction wherein the exhaust-steam is utilized for assisting in moving the sliding gates 35 35' inwardly and outwardly. In this form of construction the arrangement of the piston is exactly the same as in the principal form, and the inlet-steam is conducted to the chamber 26 of said piston through the passage 69. I form, however, on the outer face of the front side piece of the circular casing a double cylinder 83 83', and I extend the arms 79 79' of the sliding gates 35 35' into said cylinders 83 83', respectively, said arms forming piston-stems and having piston-heads 84 84' at their inner ends within the cylinders. Now the exhaust-passage 85, which corresponds to the exhaust 82 of the first-described form of construction, is closed at both ends; but its front end communicates with a passage 86. The exhaust-steam, therefore, which passes from the exhaust-chamber 26' of the rotating piston 24 to this passage 85 is free to pass into the passage 86 and from said passage 86 by the two branch passages 87 87' into the cylinders 83 83'. In the position of the pistons 84 84', Fig. 10, the eccentric projection of the piston 24 is at its lowest point. It will be understood that the pistons 84 84' are intended to work alternately, and in explanation of this it is to be stated that when the piston 24 is started on its rotation live steam will get back of the gate 35', and this live steam will be sufficient to overcome the pressure of the exhaust-steam through the exhaust-opening 87' against the piston 84', (it being understood that said piston is at its outstroke at this time,) and hence said piston 84' will be moved inwardly. Exhaust-steam in the chamber 19 and in the space 34 will also be acting respectively against both the inner and outer edges of the gate 35. Now the piston 84 being at this time on its instroke and being acted on by the exhaust-steam coming through the passage 87, and the inner edge of the gate 35 being also at the same time acted on by the exhaust-steam in the chamber 19, the combined pressure is sufficient to overcome the pressure of the exhaust-steam in the space 34 against the rear edge of the gate 35, and hence said gate will be moved outwardly. It will of course be understood that when either piston 84 or 84' reaches the opening 88 the exhaust-steam back of the piston passes down the passage 88 and out through the discharge 89. In this form of construction I also prefer to provide a different form of gland for the packing of the shaft 20. Each of the bearings for the side of the casing of this shaft is formed with a recess in which is disposed a packing similar to 22 in the first-described form. Against this packing is adapted to bear a plate 90. The glands are indicated by the numerals 91 91, and between these glands and the plates 90 are disposed coiled springs 92 92, which bear against the plates 90 and serve to hold the packings tightly in the recesses. The glands are held in place on the shaft by means of bolts 93.

The form of construction shown by Figs. 12, 13, 14, and 15 of the drawings comprehends a structure wherein the piston is non-rotatable; but the casing in which the piston is disposed is rotatable, said casing being in the form of a wheel. In explanation of this form the casing forming the chamber 19 is indicated by the numeral 94 and has radiating therefrom a series of spokes 95, which extend to and connect with an outer rim or periphery 96. The piston has projecting therefrom outwardly through the front side of the casing 94 a stationary shaft 97. This shaft has formed therein longitudinally passages 98 98', which at their outer ends are united and lead to an exhaust 99. The inner ends of these passages communicate, respectively, with ducts 100 100', which ducts lead to the chambers 26 26' of the piston the same as the ducts 72 and 75 of the other forms of construction. It will be understood also that the piston of this modified form is exactly like the piston of the other forms, excepting that it is stationary instead of being rotatable, the eccentric portion 25 thereof always occupying the lowermost position. The projecting shaft is intersected by a tapering opening 101, which of course also intersects the passages 98 and 98'. In this opening is fitted a conical valve 102, said valve being provided with two openings 103 and 103' therethrough, said openings being arranged at right angles to each other, but adapted when the valve is turned to alternately register with the passages 98 and 98'. The inlet-opening 104 is advisably arranged on top of the projecting stationary shaft 97 and has a passage 105 leading downwardly therefrom to the valve-opening 101. This passage 105 communicates with the two passages 98 and 98' by means of branch passages similar to 106 106'. The passage 105 also communicates with a long passage 107, said passage extending the length of the shaft 97, so as to conduct steam to the rear face of the piston, and thereby counteract the effect of the pressure of the steam between the front face of the piston and the adjacent inner face of the front side of the casing 94. This passage 107 also communicates with an annular recess 108, from which two passages 109 and 109' extend in opposite directions, said passages leading, respectively, to recesses 110 110', which recesses form the guideways for the sliding gates 111 111' of this form of construction. These gates may be provided at their inner edges with packing 112 112 and at their side edges with packings 113.

The end of the valve-stem is fitted with the operating-handle 44, and also has mounted loosely thereon the arm 45, said arm having rigid therewith the segmental rack 46, which is adapted to be engaged by the dog 47 of the operating-arm 44. There is also arranged the upright tubular shaft 52, which has mounted thereon a grooved pulley 114. Over this pulley passes a belt 115, and said belt also passes over two idle-pulleys 116 116 and finally around a grooved pulley 117, fast to the side of the rotatable casing. The grooved pulley 114 has also extending upwardly therefrom ears or lugs 118, to which the governor-ball links 57 57 are pivotally secured, said links carrying at their outer ends the governor-balls 58 58. The tubular shaft 52 is also provided with a cap 60, having an annular groove in its lower end in which the collar 62 is revoluble, said collar being connected to the links of the governor-balls by the other links 63 63. The tubular shaft has also passing therethrough the rod 64, which has the adjusting-nut 65 mounted on its upper end and is pivotally connected at its lower end to the arm 45. It is obvious that as the cylindrical casing is revolved the grooved pulley 117, fast thereto, is revolved therewith, and this rotation is communicated through the belt 115 to the pulley 114 and the governor-balls carried thereby. It follows that if the speed becomes too great the governor-balls will fly out by centrifugal force and cause a downward movement of the cap 60 against the action of the coiled spring 59, and at the same time also cause a downward movement of the rod 64. The latter will act on the arm 45 and cause a shifting of the conical valve in the same manner as explained in regard to the construction shown on Sheets 1, 2, and 3 of the drawings.

In explanation of the operation of the form of construction of Figs. 12, 13, 14, and 15, and which form has just been explained, if the conical valve is in position shown in Figs. 13 and 15 the opening 103 of the valve is in register with the passage 105, while the opening 103' of the valve is in register with the passage 98. The steam, therefore, which enters the inlet 104 passes into the passage 105, thence through the opening 103 of the valve, and from the passage 105 into the branching passage 106' and is conducted by said passage to the passage 98'. The steam flows along inwardly through this passage 98' to the port 100', and thence into the chamber 26' of the piston, finding its exit out of said chamber into the space between the tight contact-point of the eccentric, formed by the packing therein, and the under side of the sliding gate 111'. The expansive power of the steam confined in the space, of course, cannot turn the piston, as said piston is fast. However, as the cylindrical casing is mounted revolubly on the outwardly-extending shaft 97, which forms the axis therefor, the expansive power of the steam will cause the circular casing to rotate in the direction of the arrow. As said casing is thus rotated the moment the ports of the respective chambers of the piston get above or below the sliding gates exactly the same operation takes place as that described in reference to the construction shown on Sheets 1, 2, and 3 of the drawings, excepting that the exhaust-steam which enters the chamber 26 of the piston passes by way of the passage 100 into the passage 98, thence through the opening 103' of the valve to the exhaust 99. Of course when it is desired to reverse the engine all that is necessary is to shift operating-handle 44 so as to bring the opening 103' into register with the passage 105 and the opening 103 into register with the passage 98'. The inlet will then be through the passage 98 and the exhaust through the passage 98'. As previously stated, the inlet-steam passing into the passage 105 is also free to pass into the passage 107, and a part of the steam passes to the rear side of the piston in order to balance said piston, and the steam in said passage 107 is also free to pass into the passages 109 109' and to be conveyed to the recesses 110 110', forming the guideways for the gates 111 111'. The steam which thus enters the recesses 110 110' acts against the outer edges of the gates 111 111' and serves to keep said gates at all times against the periphery of the piston. The steam-leads 29 (shown in Fig. 8 of the drawings) are not absolutely necessary to successful results, as the pressure effected by the periphery or edge of the piston will be sufficient to slide the gates outwardly when the contour of the piston requires that this should take place in order that the gates accommodate themselves to the irregular contour of the periphery of the piston. In the form illustrated on Sheets 5 and 6 of the drawings, I have therefore omitted the steam-leads 29. If desired, also, instead of providing a diagonally-arranged spring-actuated packing-strip in the edge of the eccentric I can provide merely a straight packing-strip, such as 119, which may be spring-actuated or not, as desired.

Fig. 16 of the drawings illustrates a modification in the arrangement of the piston and sliding gate. The piston in this instance is indicated by the numeral 120 and is provided on opposite sides with the grooves 121 121. The gate is indicated by the numeral 122, and its inner edge bears against the periphery of the piston and at opposite ends of said edge is provided with L-shaped extensions 123 123, the inwardly-extending portions of said L-shaped projections passing into the grooves 121 121. It will be understood that the grooves 121 follow the contour of the periphery of the piston, and thereby admit of the gate being forced outwardly and inwardly in its guideway with the varying irregularities of the peripheral surface of the piston, although said gate is really connected to said piston. This modified form may perhaps be used to advantage in case the engine is used with gas as the actuating medium, the mechanism being set in motion by the ignition and explosion of the gas, as is usual in such form of devices.

From the above description it is thought that the operation, construction, and advantages of my improved engine will be understood. It will be seen that the engine has no dead-center, but is always at the full-power point. It is simple in construction and operation, and friction and cross-strain are reduced to the minimum. The movable gates are balanced, and in the forms illustrated in the first four sheets of the drawings they are not operated from the power of the piston alone, but through dead or live steam set apart for that purpose. The moving parts are all encircled by steam, so that the use of a lubricant is unnecessary. The piston acts as a cam or eccentric, and its inlet and outlet ports are interchangeable. The engine can be stopped or reversed simply by manipulating a single lever. The engine gives the maximum power from the steam used.

In the form of engine illustrated in Figs. 12, 13, 14, and 15 of the drawings the radiating spokes 95, and the connecting outer peripheral rim 96 possess a distinct advantage. For instance, the revolving part is preferably rotated by means of a belt. Now it would not be practical to pass this belt directly around the casing 94, as the heat within the casing would have the effect of injuring the belt in a very short time. By providing the radiating spokes and the outer connecting-rim, however, and passing the belt around said outer rim the belt is removed from any injurious effects from the heat.

It will be understood that the gates 111 111' for the form illustrated in Figs. 12, 13, 14, and 15 of the drawings can be used for the form of device illustrated on the first three sheets of drawings, or vice versa, and the particular gates of the form shown on the first three sheets of drawings can be used with the form of engine shown by Figs. 12, 13, 14, and 15.

I wish to here state that I do not intend to be understood in any manner as limiting myself to the specific details of construction herein shown and described, but that the parts may be changed without departing from the broad scope of my invention.

While I have described steam throughout the specification as the actuating medium, yet I do not wish to be understood in any sense as restricting myself thereto, as any other suitable actuating medium may be employed—such, for instance, as compressed air, gas, &c.

What I claim as my invention is—

1. In an engine, the combination, of a casing and a piston within the chamber of the casing, one of said parts being rotatable and said piston provided with an inlet-passage and with an exhaust-passage in communication with the chamber of the casing, a part provided with a valve-opening, and having an inlet-opening leading thereto, and an exhaust-opening leading therefrom, and also having passages leading therefrom and adapted to communicate with the inlet and exhaust passages of the piston, a valve for regulating the inlet and exhaust passages, said valve provided with a projecting stem, a governor-shaft and governor mechanism in connection therewith, mechanism between the rotatable part and said governor mechanism for imparting the rotation of the rotatable part to said governor-shaft, a rod, a connection between said rod and the governor-ball stems of the governor-ball mechanism, an arm to which the lower end of said rod is connected, the opposite end of said arm being loosely mounted on the stem of the valve, a segmental rack fast on the end of the arm, and an operating-handle fast to the stem of the valve, and provided with a dog adapted to engage the segmental rack.

2. In an engine, the combination, of a casing and a piston within the chamber of the casing, one of said parts being rotatable, and said piston provided with a suitable inlet-passage and an exhaust-passage in communication with the chamber of the casing, a part having a valve-opening therein, with an inlet-opening leading thereto and exhaust-opening leading therefrom, and provided with passages leading to the inlet and exhaust passages of the piston, a valve for regulating the inlet and exhaust passages, said valve provided with a projecting stem, a tubular governor-shaft, mechanism between said shaft and the rotatable part for imparting the rotation of the latter to the governor-shaft, governor-ball stems pivoted to the governor-shaft and carrying governor-balls at their outer ends, a slidable cap fitted to the outer end of the governor-shaft, links connecting said cap with the governor-ball stems, a rod passing through the cap and through the governor-shaft, a coiled spring about the governor-shaft below the slidable cap, an arm to which the lower end of the rod is connected, the opposite end of said arm being loosely mounted on the stem of the valve, a segmental rack fast to the end of the arm, and an operating-handle fast to the stem of the valve, and provided with a dog adapted to engage the segmental rack.

3. In an engine, the combination of a casing, and a piston within the chamber of the casing, one of said parts being rotatable, said piston having peripheral steam-leads, and provided with inlet and exhaust passages communicating with the chamber of the casing mechanism for regulating the inlet and exhaust passages, slidable gates working in passage-ways in the casing and bearing at their inner edges against the periphery of the piston, the steam-leads of the piston adapted to permit steam to bear against the inner edges of the gates, and means for conveying steam to the space of the passage-ways for the gates between the outer edges of said gates (which edges present greater surfaces than the inner edges) and the outer ends of the passage-ways.

4. In an engine, the combination, of a casing and a piston within the chamber of the casing, one of said parts being rotatable, said piston having inlet and exhaust passages communicating with the chamber of the casing mechanism for regulating the inlet and exhaust passages, slidable gates working in passage-ways in the casing, and bearing at their inner edges against the periphery of the piston, said inner edges having projecting arms which extend out to the external atmosphere, and means for conveying steam to the space of the passage-ways for the gates between the outer edges of said gates, and the outer ends of the passage-ways.

5. In an engine, the combination, of a casing, and a piston within the chamber of the casing, one of said parts being rotatable, said piston having inlet and exhaust passages communicating with the chamber of the casing mechanism for controlling the inlet and exhaust passages, with a double cylinder formed on or secured to the casing, the cylinders provided with ports for the inlet and outlet of exhaust-steam, and slidable gates working in passage-ways in the casing and bearing at their inner edges against the periphery of the piston, the said inner edges having arms projecting therefrom and extending into the cylinders and provided at their ends within the cylinders with pistons.

6. In an engine, the combination, of a casing and a piston within the chamber of the casing, one of said parts being rotatable, said casing provided with inlet and exhaust passages leading to recesses on the inner faces of the opposite sides of the casing, which recesses communicate with passages running through and out of the piston, and the piston provided upon opposite sides with steam-channels, which are in communication with the recesses on the inner faces of the sides of the casing by means of connecting-passages, set-screws for regulating said connecting-passages, and slidable gates adapted to act in conjunction with the piston to divide the chamber into interchangeable inlet and exhaust compartments, and a valve provided with suitable ports, so arranged that when one port is in register with the inlet, the other port is out of register therewith.

7. In an engine, the combination, of a casing and a piston within the chamber of the casing, one of said parts being rotatable, and the casing provided with an inlet and with an exhaust, and with a valve-opening in communication with the inlet, said valve-opening provided with passages leading therefrom to the interior chamber of the casing, and a valve within the valve-opening, and having ports therethrough at right angles to each other, one of said ports having a passage leading thereto at an angle, said ports being thus arranged so that when one port is in register with the inlet and with the passage leading to the chamber of the casing, the other port is out of register with the inlet but in register with the exhaust and with the other passage leading from the inner chamber of the casing, and when the valve is given a partial turn, the passage of said valve leading to the port at one end thereof will be brought into register with the inlet, and the other port of the valve to which said passage leads into register with the exhaust-passage, while the port at the opposite end of the valve is brought into register with the inlet-passage, whereby a reversal of the engine is obtained.

8. In an engine, the combination, of a casing and a piston within the chamber of the casing, one of said parts being rotatable, said casing provided with suitable inlet and exhaust passages, a valve for regulating the inlet and exhaust passages, said valve provided with a projecting stem, a governor-shaft and governor mechanism in connection therewith, mechanism between the rotatable part and said governor shaft for imparting the rotation of the rotatable part to said governor-shaft, a rod, a connection between said rod and the governor-ball stems of the governor-ball mechanism, an arm to which the lower end of said rod is connected, the opposite end of said arm being loosely mounted on the stem of the valve, a segmental rack fast to the end of the arm, and an operating-handle fast to the stem of the valve and provided with a dog adapted to engage the segmental rack.

9. In an engine, the combination, of a casing and a piston within the chamber of the casing, one of said parts being rotatable, said casing provided with suitable inlet and exhaust passages, a valve for regulating the inlet and exhaust passages, said valve provided with a projecting stem, a tubular governor-shaft, mechanism between said shaft and the rotatable part for imparting the rotation of the latter to the governor-shaft, governor-ball stems pivoted to the governor-shaft and carrying governor-balls at their outer ends, a slidable cap fitted to the outer end of the governor-shaft, links connecting said cap with the governor-ball stems, a rod passing through the cap and through the governor-shaft, a coiled spring about the governor-shaft below the slidable cap, an arm to which the lower end of the rod is connected, the opposite end of said arm being loosely mounted on the stem of the valve, a segmental rack fast to the end of the arm, and an operating-handle fast to the stem of the valve, and provided with a dog adapted to engage the segmental rack.

In testimony whereof I affix my signature in presence of two witnesses.

JOHN P. DORAU.

Witnesses:
ARTHUR L. MORSELL,
JOSEPHINE FAUST.